W. T. BISHOP.
HAY BALER.
APPLICATION FILED AUG. 24, 1909.
960,796.
Patented June 7, 1910.
2 SHEETS—SHEET 2.
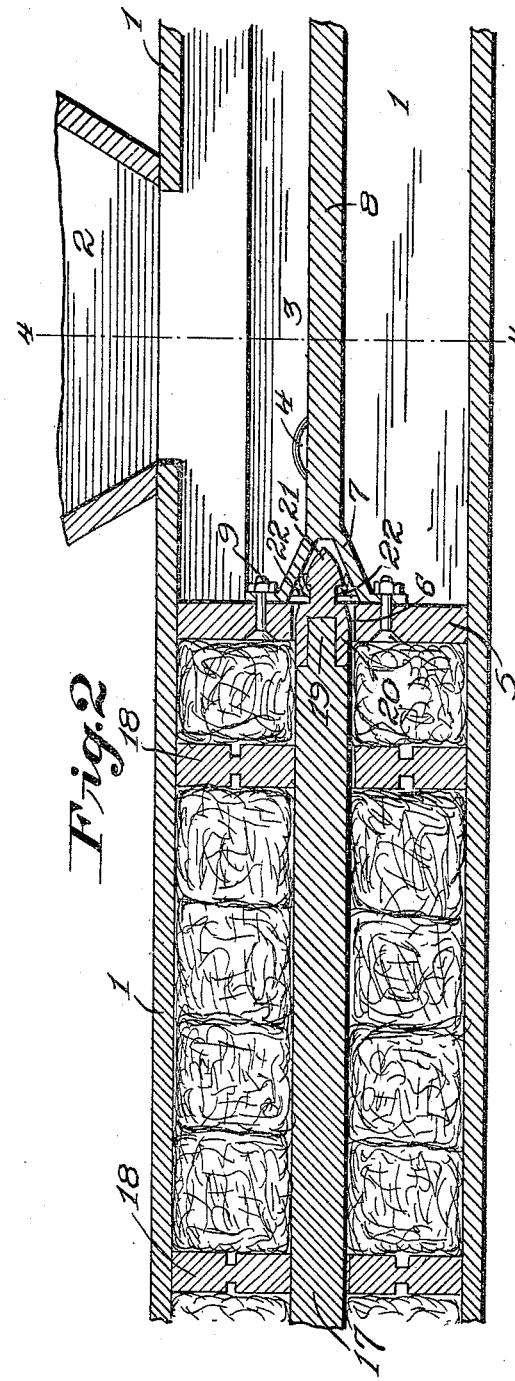
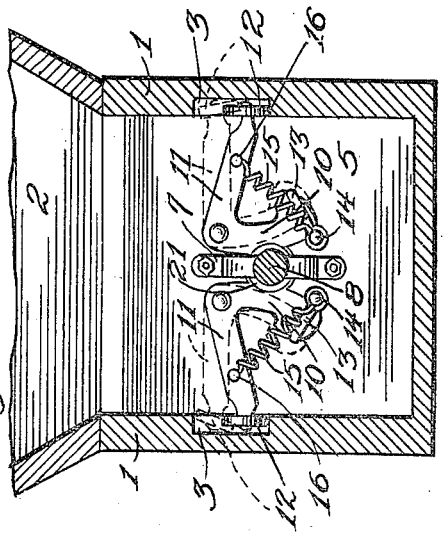
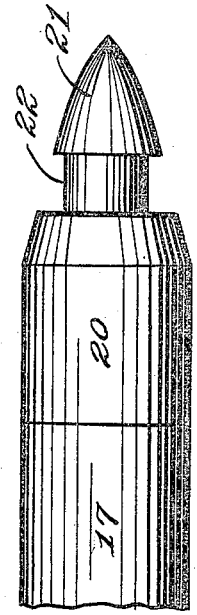
Witnesses
Inventor
William T. Bishop.

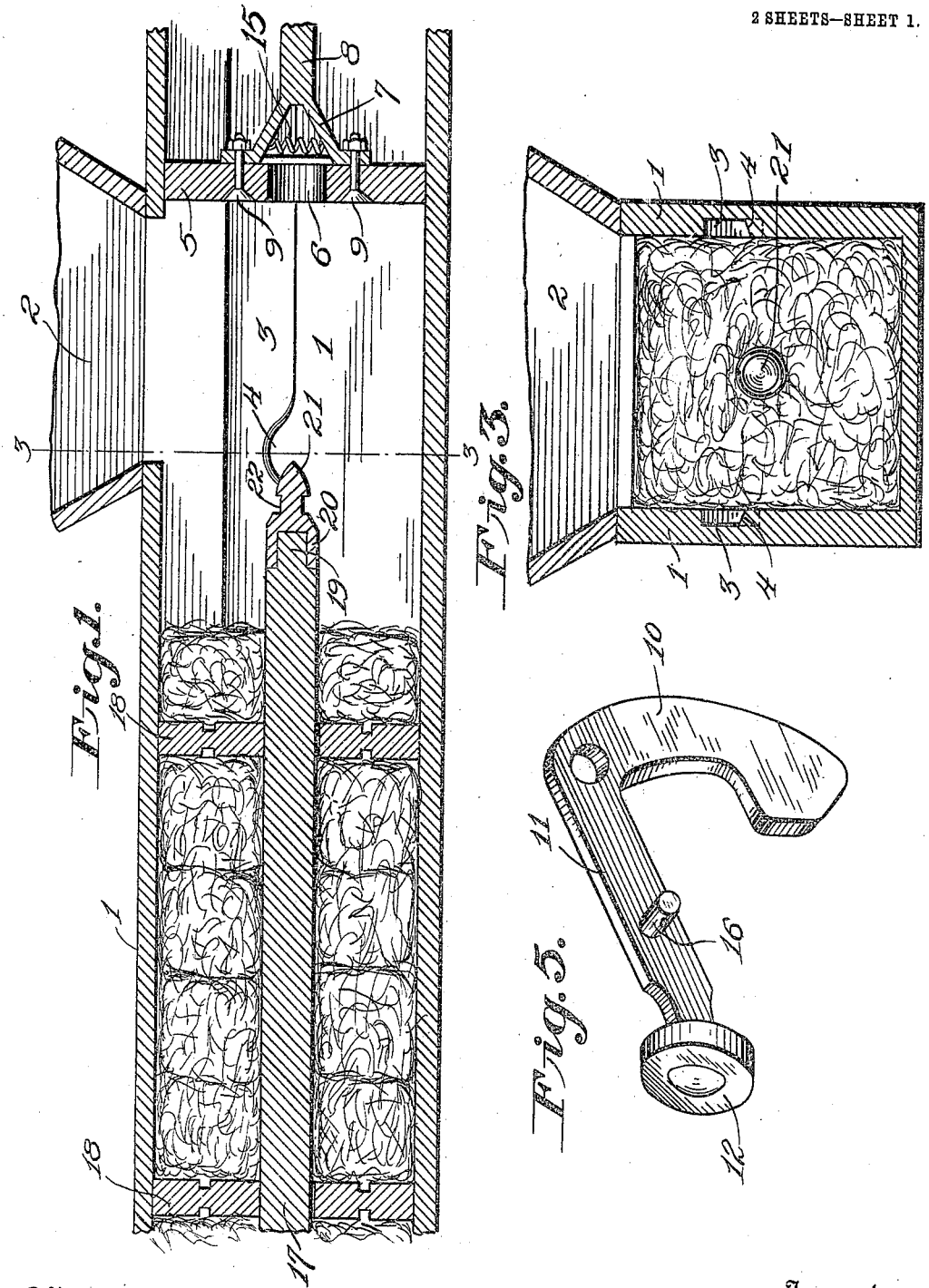

UNITED STATES PATENT OFFICE.

WILLIAM T. BISHOP, OF MANKATO, KANSAS.

HAY-BALER.

960,796. Specification of Letters Patent. Patented June 7, 1910.

Application filed August 24, 1909. Serial No. 514,397.

*To all whom it may concern:*

Be it known that I, WILLIAM T. BISHOP, a citizen of the United States, residing at Mankato, in the county of Jewell and State of Kansas, have invented certain new and useful Improvements in Hay - Balers, of which the following is a specification, reference being had therein to the accompanying drawing.

This invention relates to baling presses and the principal object of the same is to provide means within the presses which will automatically punch a hole through the center of the bales so that air may circulate therethrough to prevent mold or decay.

In carrying out the object of the invention generally stated above, it is contemplated providing a longitudinally arranged punch which coöperates with the plunger to penetrate the bales while being formed, said plunger being provided with means for engagement with the head of said punch on the forward stroke of the plunger, and to automatically release the punch on the rearward stroke.

In the practical application of the invention, it will be understood, of course, that the essential features thereof are necessarily susceptible of changes in detail and structural arrangements, one preferred and practical embodiment of which is shown in the accompanying drawings, wherein—

Figure 1 is a fragmentary vertical longitudinal sectional view of the improved press, as it appears when receiving the material to be baled. Fig. 2 is a similar view showing a bale being formed. Fig. 3 is a vertical transverse sectional view taken on the line 3—3, Fig. 1. Fig. 4 is a similar view taken on the line 4—4, Fig. 2. Fig. 5 is a detail perspective view of one of the gripping levers carried by the baling plunger. Fig. 6 is a detail view in side elevation of the penetrating head of the punch.

Referring to said drawings by numerals, 1 designates the usual elongated box-shaped body of the baling press, the central portion thereof being provided with a hopper 2 through which the material to be baled is fed. Oppositely disposed longitudinal grooves 3 are formed on the inner sides of the press body below said hopper, said grooves having an upstanding rounding portion 4 formed therein against their forward end. A plunger head 5 is slidably fitted within said body, said head being provided with a central opening 6, the rear end of which is straddled by the flanged and forked end 7 of the plunger rod 8, said forked and flanged end 7 being rigidly fastened to the rear face of the plunger head over said opening by means of the bolts 9 or other convenient fasteners. A pair of bell crank levers are pivotally mounted on the rear face of said plunger head, said levers being disposed on opposite sides of said opening 6 and provided with a curved pendent leg 10, and substantially straight right angular leg 11, the outer end of which forms a shaft for a roller 12 which enters the side grooves 3 of said body. The free end of said leg 10 is preferably enlarged and projects beneath a guide bar 13 fastened to said flanged head by means of a bolt 14, said bolt 14 also having one end of a spring 15 fastened thereon, the other end of said spring being fastened to a pin 16 projecting from the leg 11. By means of said spring, it will be seen that normally the inner edge of the rounded leg 10 is held partly across the opening 6 formed through the plunger head 5.

A punch rod 17 is longitudinally supported in the press body by means of the spacer blocks 18 and also by the previously formed bales so that it is in alinement with the opening 6 of the plunger head. The inner end of said rod is reduced as indicated at 19 and engaged by a socket 20 of a tapering penetrating head 21, an annular holding groove 22 being formed between said socket and head.

The operation of the invention is as follows:—On the forward movement of the plunger head 5, the rollers 12 of the bell crank levers travel along the grooves 3 until the projections 4 are reached, whereupon said levers are rocked on their pivots to cause the legs 10 to be removed from across the opening 6 and permit the head 21 of the plunger to pass through said opening and have its groove 22 engaged by said legs 10 after the rollers have passed said projection 4. On the reverse stroke of the plunger, the punch will be carried with it until said rollers ride over said projections, whereupon said legs 10 will be rocked from engagement with the groove of the head of the punch, so that said punch will be left in the position shown in Fig. 1 ready to be engaged by the next forward movement of the plunger.

It will be seen from the foregoing that by means of the present invention, the openings are formed through the bale automatically, the punch being held in engagement with the plunger and through the bale while the bale is receiving its final pressing, and on the rearward stroke the punch is drawn beyond the bale to be ready for the next bale, after which it is automatically released from the plunger.

What I claim as my invention is:—

1. A baling press comprising a body, a plunger slidable therein, a punch within said body, and means carried by said plunger for engaging said punch on the forward stroke and holding the same while a bale is being formed and releasing said punch on the reverse stroke of the plunger.

2. A baling press comprising a body, a plunger slidable therein, gripping levers carried by said plunger, a punch in said body, and means for actuating said levers to cause the same to engage and hold said punch on the bale-forming stroke of said plunger and release the punch on the reverse stroke of the plunger.

3. A baling press comprising a body, a reciprocating plunger therein provided with a central opening, a pair of pivotally mounted gripping levers disposed on opposite sides of said opening, a punch in said body and in alinement with said opening, and means for rocking said levers to cause the same to engage said punch during the bale-forming movement of said plunger.

4. A baling press comprising a body, a reciprocating plunger therein, said plunger being provided with a central opening, pivotally mounted rocking levers disposed on opposite sides of said opening, a punch in said body and supported in alinement with said opening, said punch being provided with an annular holding groove, and means for actuating said levers to cause the same to engage said holding groove while a bale is being formed.

5. A baling press comprising a body provided with oppositely disposed guiding grooves, said grooves provided with upstanding end portions, a reciprocating plunger in said body and provided with a central opening, gripping levers disposed on opposite sides of said opening, a roller carried by each lever and mounted in said grooves and adapted to rock said levers when passing over said upstanding portions, and a punch in said body and adapted to enter said opening and be engaged by said levers while a bale is being formed.

6. A baling press comprising a body, a reciprocating plunger therein, a punch, and gripping means carried by said plunger for engaging and holding said punch while a bale is being formed.

7. A baling press comprising a body, a reciprocating plunger therein, a longitudinally arranged punch in said body, and means carried by said plunger for automatically engaging and holding said punch on the bale-forming stroke of said plunger and automatically releasing said punch on the reverse stroke of the plunger.

8. A baling press comprising a body provided with guiding grooves having a raised portion, a plunger slidably mounted in said body and provided with a central opening, rocking levers disposed on opposite sides of said opening, means for normally holding said levers across said openings, a roller carried by each lever and mounted in said grooves and adapted to rock said levers from across said opening when passing said raised portions, and a plunger in said body adapted to pass through said opening and be engaged by said levers on the bale-forming stroke of the plunger and be released on the reverse stroke of said plunger.

In testimony whereof I hereunto affix my signature in presence of two witnesses.

WILLIAM T. BISHOP.

Witnesses:
E. M. MAXWELL,
R. E. MORGAN.